US009155167B2

(12) United States Patent
Staab et al.

(10) Patent No.: US 9,155,167 B2
(45) Date of Patent: Oct. 6, 2015

(54) REGISTERING A REPLACEABLE RF-ENABLED FLUORESCENT LAMP STARTER UNIT TO A MASTER UNIT

(75) Inventors: David R. Staab, Los Gatos, CA (US); Murray C. Baker, Vancouver (CA)

(73) Assignee: IXYS Intl Limited (KY)

( * ) Notice: Subject to any disclaimer, the term of this patent is extended or adjusted under 35 U.S.C. 154(b) by 1430 days.

(21) Appl. No.: 12/587,152

(22) Filed: Oct. 1, 2009

(65) Prior Publication Data
US 2011/0080091 A1 Apr. 7, 2011

(51) Int. Cl.
*H05B 37/02* (2006.01)
(52) U.S. Cl.
CPC ........ *H05B 37/0227* (2013.01); *H05B 37/0272* (2013.01); *Y02B 20/44* (2013.01)
(58) Field of Classification Search
USPC ............. 315/61, 291, 224, 209, 94, 100, 104, 315/106–107, 112, 116
See application file for complete search history.

(56) References Cited

U.S. PATENT DOCUMENTS

| 2,936,403 | A  | * | 5/1960  | Knobel ......................... 315/100 |
| 6,859,644 | B2 | * | 2/2005  | Wang ......................... 455/159.2 |
| 7,307,542 | B1 |   | 12/2007 | Chandler et al. ......... 340/825.52 |
| 7,397,194 | B2 | * | 7/2008  | Garbowicz et al. ............. 315/86 |
| 7,446,671 | B2 |   | 11/2008 | Giannopoulos et al. . 340/825.72 |
| 7,554,274 | B2 |   | 6/2009  | Wang et al. ................... 315/317 |
| 7,560,867 | B2 | * | 7/2009  | Schwannecke et al. ........ 315/94 |
| 2004/0046511 | A1 | * | 3/2004  | Porter ........................... 315/291 |
| 2004/0217718 | A1 |   | 11/2004 | Kumar et al. ................. 315/291 |
| 2006/0044152 | A1 | * | 3/2006  | Wang ............................ 340/825 |
| 2009/0026966 | A1 |   | 1/2009  | Budde et al. .................. 315/152 |
| 2009/0315485 | A1 | * | 12/2009 | Verfuerth et al. ............. 315/320 |

FOREIGN PATENT DOCUMENTS

GB 2155258 A 1/1984

OTHER PUBLICATIONS

Sinem Coleri Ergen, "ZigBee/IEEE 802.15.14 Summary", Sep. 10, 2004, pp. 1-35.

(Continued)

*Primary Examiner* — Tuyet Vo
*Assistant Examiner* — Henry Luong
(74) *Attorney, Agent, or Firm* — Imperium Patent Works; T. Lester Wallace; Darien K. Wallace

(57) ABSTRACT

A replaceable fluorescent lamp starter unit of a fluorescent light fixture has a built-in RF transceiver, and communicates wirelessly with a motion-detecting master unit. The starter unit can be controlled to turn off and turn on the fluorescent lamp of the fixture. The starter unit is registered to the master unit so that the starter unit will not respond to wireless communications from other sources. During registration, registration information is loaded into the starter unit and stored in non-volatile memory. The stored registration information is later usable to determine whether subsequently received wireless communications are for the starter unit. Systems of existing light fixtures are retrofitted with such wireless starter units, and thereby made controllable by a master unit so that the master unit can turn off the lights to conserve energy if room occupancy is not detected. The master unit can control lamp fixtures individually or as a group.

16 Claims, 7 Drawing Sheets

CENTRAL MASTER UNIT CONTROLS MULTIPLE LIGHT FIXTURES VIA RF-ENABLED STARTER UNITS

(56) References Cited

OTHER PUBLICATIONS

Mikhail Galeev, "Embedded Systems Programming: Will Bluetooth, ZigBee, and 802.11 all have a place in your home? Here's what ZigBee offers for home wireless networking", Apr. 20, 2004, pp. 1-6.
Dan Strassberg, "Simple networks will free many sensors from wires", Apr. 13, 2006, pp. 2-3.
G. Bhatti, A. Mehta, Z. Sahinoglu, J. Zhang, and R. Viswanathan, "Modified Beacon-Enabled IEEE 802.15.4 MAC for Lower Latency", Apr. 2009, pp. 1-6.
Jeffrey Z. Tao, Shivendra S. Panwar, Daqing Gu, Jinyun Zhang, "Performance Analysis for the IEEE 802.15.4 Contention Access Period", downloaded Sep. 2009, pp. 2-19.
Atmel Corporation, "ATAVRFBKIT/EVLB001 Dimmable Fluorescent Ballast User Guide", Oct. 2007, pp. 1-32.
Bob Nelson and Chris Marshall, "Request for Specification Input (RSI) Technical Requirements Document", Apr. 26, 2000, pp. 2-19.
Patrick Kinney, "ZigBee Technology: Wireless Control that Simply Works", Oct. 2, 2003, pp. 2-21.
Bob Heile, "Wireless Sensors and Control Networks: Enabling New Opportunities with ZigBee", Dec. 2006, pp. 2-52.
Royal Philips Electronics, Samsung Electronics Co., Ltd., Sony Corporation and ZigBee Alliance, "ZigBee and RF4CE Set New Course for Consumer Electronic Remote Controls", Mar. 3, 2009, pp. 1-3.
Bo Gao and Chen He, "An Individual Beacon Order Adaptation Algorithm for IEEE 802.15.4 Networks", May 2008, pp. 12-16.
Francis Rubenstein, "After DALI: A Look at What's Next", Jan. 16, 2005, pp. 3-4.
Dali Specification Guide, downloaded Sep. 2009, pp. 5-71.
Daintree Networks, "Introducing ZigBee RF4CE", Apr. 2009, pp. 1-4.
Module: ZigBee Overview, downloaded Sep. 2009, pp. 1-34.
Yao-Jung Wen, "Wireless Sensor and Actuator Networks for Lighting Energy Efficiency and User Satisfaction", Fall 2008, pp. 1-261.
Liang Cheng, "IEEE 802.15.4 MAC Protocol Study and Improvement", Dec. 2007, pp. 1-86.
Extended European Search Report (Office action) by EPO in related European application EP10183033 dated Feb. 2, 2011 (9 pages).

* cited by examiner

CENTRAL MASTER UNIT CONTROLS MULTIPLE LIGHT
FIXTURES VIA RF-ENABLED STARTER UNITS

INITIAL CONDITION

PREHEATING

HIGH VOLTAGE

IGNITION AND USAGE

TURN OFF - STEP ONE

TURN OFF - STEP TWO

TURN OFF - STEP THREE

TURN OFF COMPLETE

NEIGHBORING SYSTEMS

DETECTING A VOLTAGE CONDITION TO INITIATE ENTERING REGISTRATION INFORMATION INTO A STARTER UNIT

DETECTING A POWER UP CONDITION TO INITIATE ENTERING REGISTRATION INFORMATION INTO A STARTER UNIT

REGISTERING A REPLACEABLE RF-ENABLED FLUORESCENT LAMP STARTER UNIT TO A MASTER UNIT

TECHNICAL FIELD

The described embodiments relate to starter units for fluorescent lamps.

BACKGROUND INFORMATION

A fluorescent light fixture involves a tubular fluorescent bulb. The fluorescent bulb is also referred to here as a fluorescent lamp. The tube is a glass tube that contains an ionizable gas and a bit of mercury. There are filaments at each end of the tube. Upon application of proper electrical voltages, the filaments can be made to heat up and to ionize the ionizable gas in the tube. If a voltage of adequate magnitude is then provided between the filaments, an electrical arc can be started through the gas in the tube between the filaments. The arc involves a flow of current from one filament, through the ionized gas, and to the other filament. Energetic electrons in this current flow collide with the mercury atoms, thereby exciting the mercury atoms and causing them to emit ultraviolet radiation. The emitted ultraviolet radiation is absorbed by and excites a phosphor coating on the inside of the walls of the tube. The phosphor coating fluoresces and emits radiation in the visible spectrum (i.e., visible light). The visible light passes outward through the glass and is usable for illuminating purposes.

Some such fluorescent light fixtures involve a circuit referred to as a "starter". In a first step, a switch in the starter closes and forms an electrical connection between the filament at one end of the tube and the filament at the other end of the tube such that an AC current can flow from an AC power source, through an inductance, through one filament, through the closed switch of the starter, and through the second filament, and back to the AC power source. This AC current flow causes the filaments to heat. The heating of the filaments causes gas surrounding the filaments to ionize. Once the gas is ionized in this way, then the switch in the starter is opened. The opening of the switch cuts current flow through the inductance, thereby causing a large voltage spike to develop across the inductance. Due to the circuit topology, this large voltage is present between the two filaments. The voltage is large enough to strike an arc through the gas. Once the arc is established, the resistance between the two filaments through the gas decreases. This allows the current to continue to flow through the gas without a large voltage being present between the filaments. The switch is left open, the current continues to flow, the filaments continue to be heated, and the arc is maintained. The fluorescent lamp is then on and emits visible light to illuminate an area.

In fluorescent light fixtures, the starter may fail. The starter is therefore sometimes made to be a replaceable unit. Great numbers of fluorescent light fixtures with replaceable starter units are installed throughout the world. Large numbers of such fluorescent light fixtures are installed in public buildings, office buildings, and other large buildings. Quite often the fluorescent lights are left on and consuming electrical energy even though the area served does not need to be illuminated. A way of preventing this waste of electrical energy is desired.

Infrared motion detecting wall switches are often employed to prevent the waste of energy due to lights being left on when lighting is not needed. If an infrared motion detector in the wall switch does not detect motion of an infrared emitter (for example, a human body) in the vicinity of the wall switch, then circuitry in the wall switch determines that the room is not occupied by a person. Presumably if a person were in the room, the person would be moving to some extent and would be detected as a moving infrared emitter. If the wall switch determines that the room is unoccupied because it does not detect any such moving infrared emitter, then the wall switch turns off the fluorescent lights on the circuit controlled by the wall switch. The wall switch turns off the fluorescent lights by cutting AC power flowing to the fluorescent lamp light fixtures through power lines hardwired into the building. If, however, the wall switch detects a moving infrared emitter, then the wall switch turns on the lights by energizing the hardwired power lines so that AC power is supplied to the fluorescent light fixtures through the hardwired power lines. The wall switch motion detection system involving hardwired power lines embedded in the walls and ceilings of buildings is quite popular, but a wireless system has been proposed whereby each of the replaceable starter units is to be provided with an RF receiver. The starter unit is then to turn off or turn on the fluorescent lamp of its light fixture in response to RF commands received from a central motion detecting occupancy detector.

SUMMARY

A replaceable fluorescent lamp starter unit of a fluorescent light fixture has a built-in RF (Radio-Frequency) receiver, and communicates wirelessly with a motion-detecting master unit. The starter unit can be wirelessly controlled to turn off the fluorescent lamp of the fluorescent light fixture of which the starter unit is a part. The starter unit can also be wirelessly controlled to turn on the fluorescent lamp. The motion-detecting master unit can be installed in a location to detect whether an area illuminated by the fluorescent light fixture is occupied by a person. The master unit may, for example, be a battery-powered unit that is fixed to the ceiling of a room.

In one novel aspect, the starter unit is registered to the master unit so that the starter unit will not respond to wireless communications from other sources. During registration, registration information is loaded into the starter unit and is stored in non-volatile memory within the starter unit. In a first example, the starter unit is put into a registration mode by supplying a DC voltage onto terminals of the starter unit. Registration information is then supplied to and is loaded into the starter unit. The starter unit stores the registration information in the non-volatile memory in the starter unit. In a second example, the starter unit is put into the registration mode by subjecting the starter unit to a predefined power up condition. Registration information is then supplied to and is loaded into the starter unit. In addition to these two ways, there are other ways of putting the starter unit into the registration mode and loading registration information into the starter unit.

Regardless of how the registration information is loaded into the starter unit, the registration information is stored in the starter unit so that it is later usable to determine whether wireless communications subsequently received by the starter unit are intended for the starter unit. Wireless commands issued by the master unit for controlling a system of fluorescent light fixtures may, for example, include a source identifier (identifying the master unit that made the transmission) and a destination identifier (identifying the starter unit for which the transmission is intended). Systems of existing light fixtures are easily retrofitted with such wireless starter units without requiring a person to touch the AC power mains, and thereby are made controllable by a master unit so that the master unit can turn off the lights if room occupancy is not detected. At the time of installation of the starter units in the field, the starter units are registered with the appropriate master unit. After registering, the fluorescent light fixtures of the system may be individually controlled or may be controlled on a group basis.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
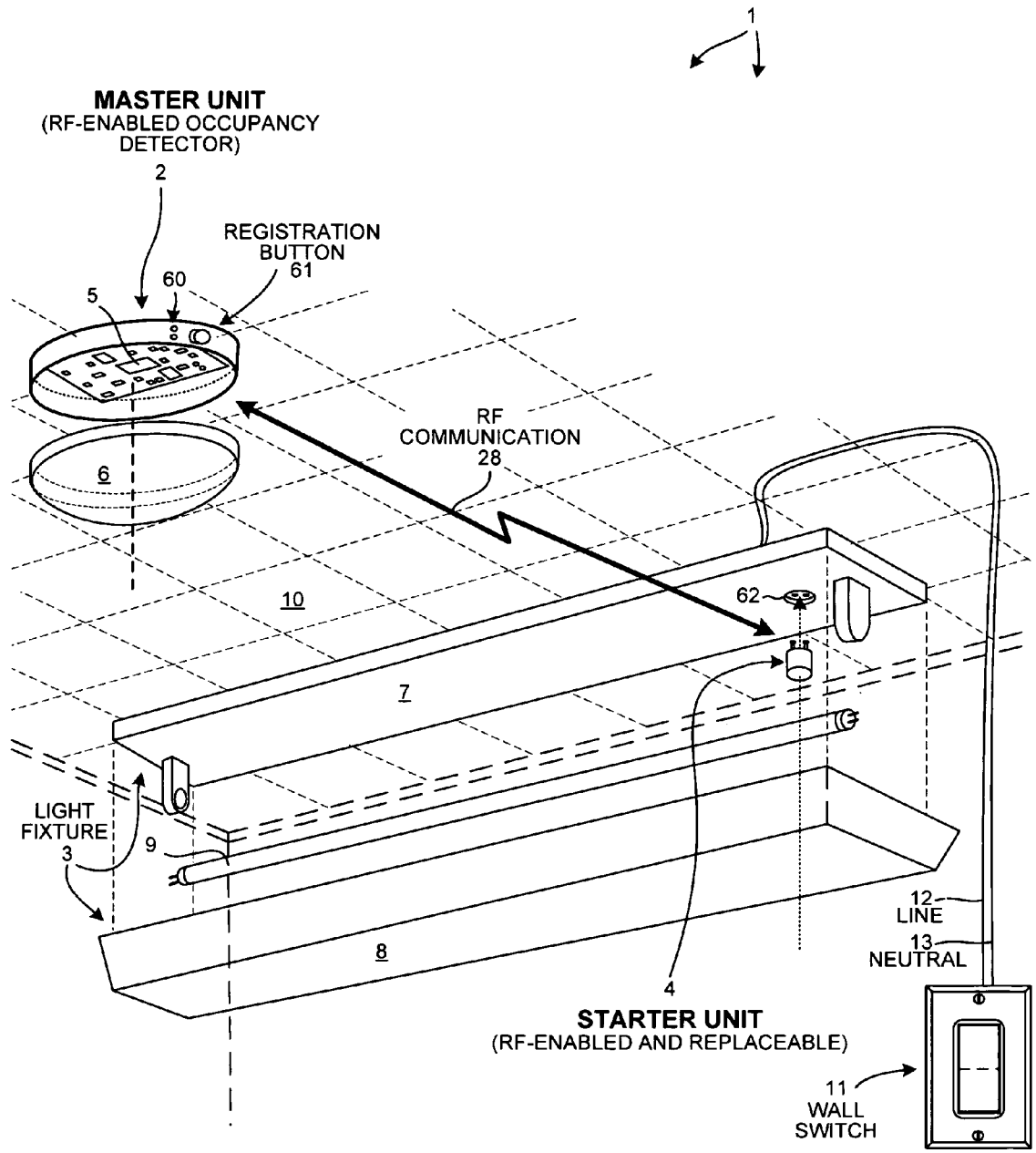
FIG. 1 is a simplified perspective diagram of a system 1 involving a master unit 2 and a fluorescent light fixture 3 involving a replaceable RF-enabled starter unit 4.

Reference will now be made in detail to background examples and some embodiments of the invention, examples of which are illustrated in the accompanying drawings. FIG. 1 is a diagram of a system 1 involving a master unit 2 and a plurality of light fixtures having fluorescent lamp starter units. One light fixture 3 and one starter unit 4 is pictured in the figure. In this example, master unit 2 is an infrared occupancy detector that involves a Passive InfraRed (PIR) sensor 5 and a multi-section fresnel lens 6. Using techniques well known in the art, master unit 2 detects motion of infrared emitters in the field of view of the fresnel lens and detects the lack of motion of such infrared emitter. If the master unit detects motion, then the master unit is to turn on or to keep on the fluorescent lamps of the fluorescent light fixtures of system 1. If, on the other hand, the master unit does not detect motion, then the master unit is to turn off the fluorescent lamps of system 1 to conserve electrical energy. In the illustration of FIG. 1, fluorescent light fixture 3 includes a base portion 7, a translucent cover portion 8, a fluorescent bulb or lamp 9, and the starter unit 4. A ballasting inductance (not shown) is part of the base portion 7. Both the light fixture 3 and the master unit 2 are fixed to the ceiling 10 of a room in a building as shown. A wall switch 11 is connected by electrical wires 12 and 13 to all the light fixtures of system 1 in standard fashion so that a person in the room can manipulate the wall switch to turn on, and to turn off, the fluorescent lights. The electrical wires 12 and 13 are embedded in the walls and ceiling of the building. In the illustrated example, wire 12 is the LINE wire, whereas wire 13 is the NEUTRAL wire.

Master unit 2 has a Radio-Frequency (RF) transceiver (transmitter and receiver) for engaging in RF communication, including RF communication with the starter units of system 1. As pictured, master unit 2 need not be connected to any hardwired electrical wiring in the building. The master unit 2 pictured is a self-contained, battery-powered; unit that is fixed to the ceiling 10 of the room illuminated by system 1. Master unit 2 can be easily fixed to ceiling 10 by application of adhesive tape or by a screw or other common attachment mechanism. Each fluorescent light fixture of system 1 includes a replaceable starter unit. Starter unit 4 pictured in FIG. 1 is one example.

Figure 2:
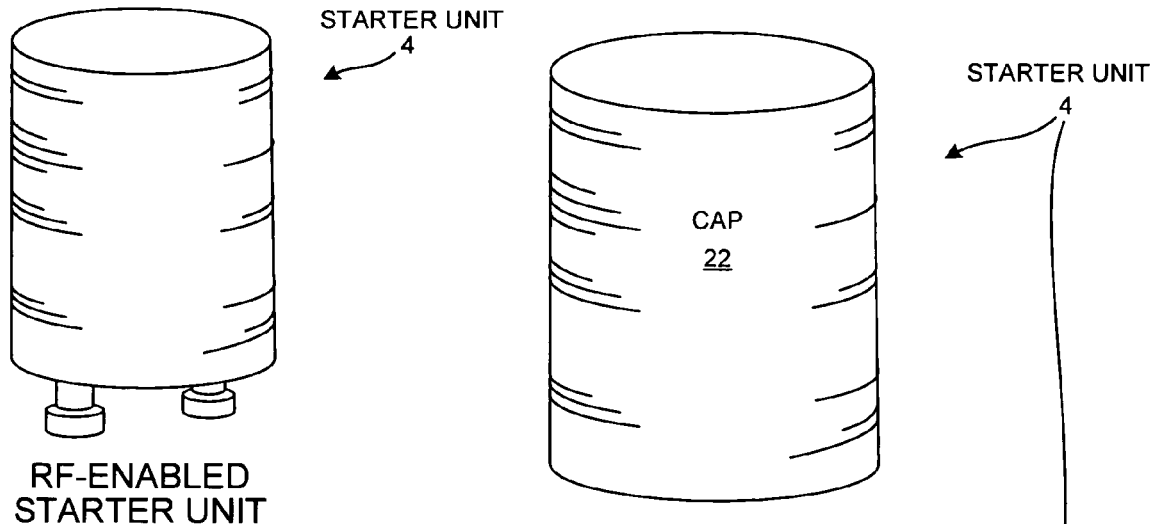
FIG. 2 is a perspective view of the RF-enabled starter unit 4 of FIG. 1.

FIG. 2 is a perspective view of starter unit 4.

Figure 3:
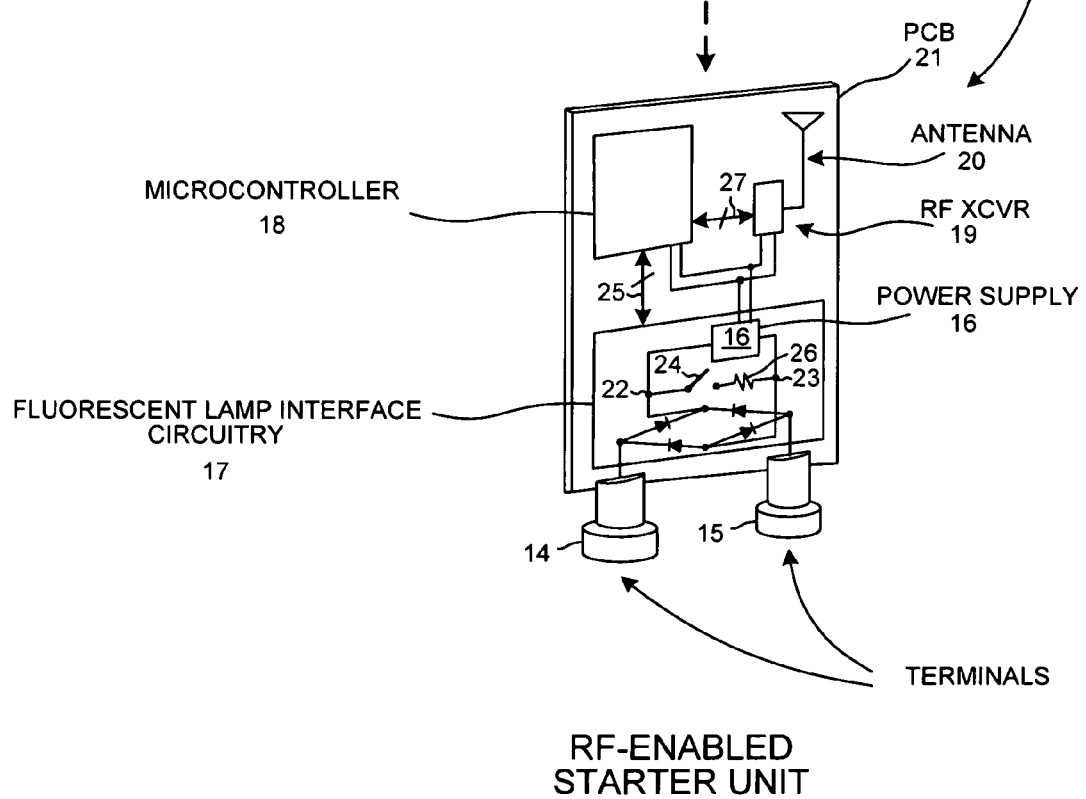
FIG. 3 is an exploded perspective view of the RF-enabled starter unit 4 of FIG. 2.
Figure 4:
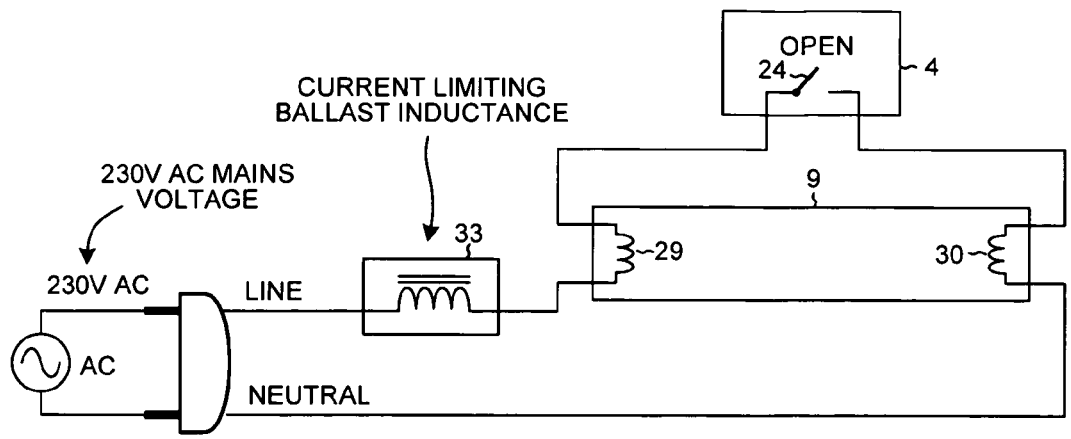
FIGS. 4-7 are circuit diagrams that illustrate how starter unit 4 can turn on fluorescent lamp 9 of the light fixture 3.

FIG. 3 is an exploded perspective view of starter unit 4. Starter unit 4 includes a first terminal 14, a second terminal 15, a power supply 16, fluorescent lamp interface circuitry 17, a microcontroller integrated circuit 18, an RF transceiver 19, and an antenna 20. This circuitry is disposed on a printed circuit board (PCB) 21 as illustrated. PCB 21 is disposed within a cylindrical cap 22. Terminals 14 and 15 extend downward through holes in a circular disk-shaped base portion (not shown) of PCB material. The circular edge of this disk-shaped base portion joins with the circular bottom edge of cap 22 and forms a circular bottom of starter unit 4.

Fluorescent lamp interface circuitry 17 includes a full wave rectifier that receives a 230 VAC signal between terminals 14 and 15 and outputs full wave rectified signal between nodes 22 and 23. Power switch 24 is a switch that is used to turn on, and to turn off, fluorescent lamp 9. Power switch 24 is a power Field Effect Transistor (FET) that is controlled by microcontroller 18 via gate drive circuitry of circuitry 17. Microcontroller 18 drives the gate of switch 24 and controls and monitors the remainder of interface circuitry 17 via signals communicated across conductors 25. Microcontroller 18 monitors and traces the AC voltage waveform between nodes 22 and 23 using an Analog-to-Digital Converter (ADC) that is part of the microcontroller. Microcontroller 18 monitors and traces the waveform of the current flowing through switch 24 by using its ADC to monitor a voltage dropped across a sense resistor 26. Microcontroller 18 uses an on-board comparator and timer to detect and time zero-crossings of the AC signal on terminals 14 and 15. Microcontroller 18 determines when and how to control switch 24 based on the detected AC voltage between nodes 22 and 23, the time of the zero-crossings of the AC signal on terminals 14 and 15, and the magnitude of current flow through switch 24.

Power supply 16 receives the full wave rectified signal between nodes 22 and 23 and generates therefrom a direct current (DC) supply voltage VDD used to power microcontroller 18, RF transceiver 19, and interface circuitry 17. Power supply 16 includes a capacitance that is charged to the DC supply voltage VDD. This capacitance is large enough that it continues to power the microcontroller and RF transceiver of the starter unit for more than five seconds after 230 VAC power is removed from terminals 14 and 15. If the starter unit 4 is installed in light fixture 3, and if wall switch 11 is toggled on and off faster than once every five seconds, then interface circuitry 17, microcontroller 18, and transceiver 19 remain powered and operational.

Microcontroller 18 communicates with and controls RF transceiver 19 via a bidirectional serial SPI bus and serial bus conductors 27. In one embodiment, microcontroller 18 is a Z8F2480 8-bit microcontroller integrated circuit available from Zilog, Inc., 6800 Santa Teresa Blvd., San Jose, Calif.

95119. Microcontroller 18 includes an amount of non-volatile memory (FLASH memory) that can be written to and read from under software control during operation of starter unit 4. In one embodiment, RF transceiver 19 is a SX1211 transceiver integrated circuit available from Semtech Corporation, 200 Flynn Road, Camarillo, Calif. 93012. Transceiver 19 is coupled to antenna 20 via an impedance matching network (not shown) and a SAW filter (not shown). The SAW filter may, for example, be a B3716 SAW filter available from the Surface Acoustic Wave Components Division of EPCOS AG, P.O. Box 801709, 81617 Munich, Germany. Antenna 20 may, for example, be a fifty ohm 0868AT43A0020 antenna available from Johanson Technology, Inc., 4001 Calle Tecate, Camarillo, Calif. 93012. The RF transceiver operates in a license free frequency band in the 863-878 MHz range (for example, about 868 MHz), in accordance with a reference design available from Semtech Corporation. The RF antenna and transceiver of starter unit 4 can receive an RF communication 28 (see FIG. 1) from master unit 2. The data payload of the communication 28 is communicated across SPI bus conductors 27 to microcontroller 18 for processing.

Figure 5:
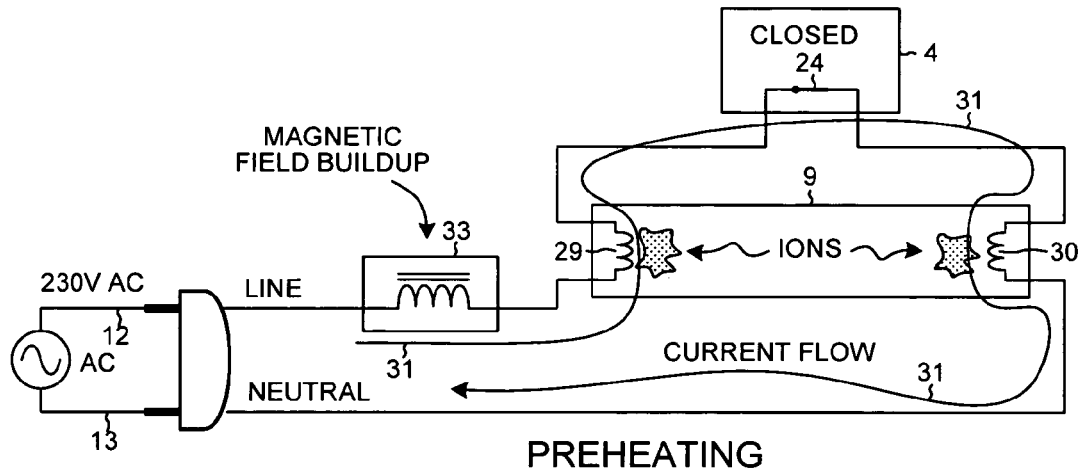
Figure 6:
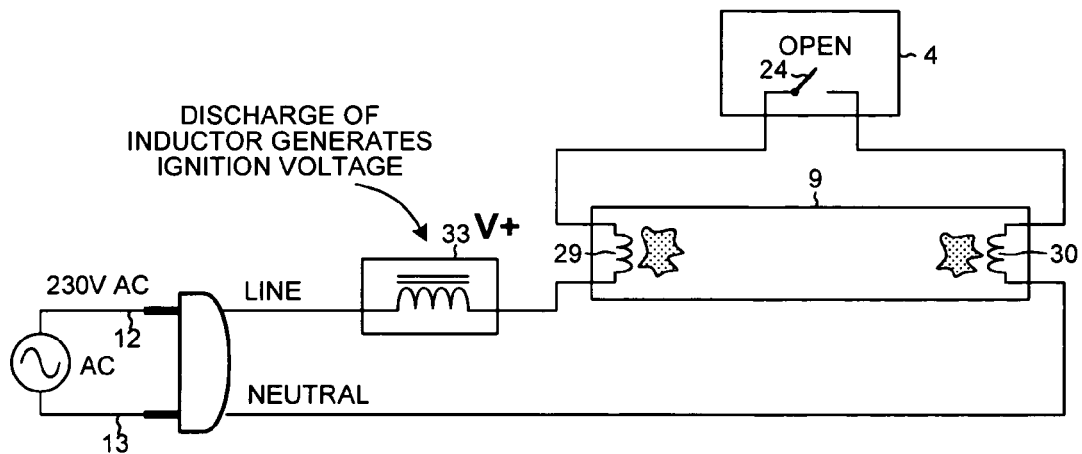
Figure 7:
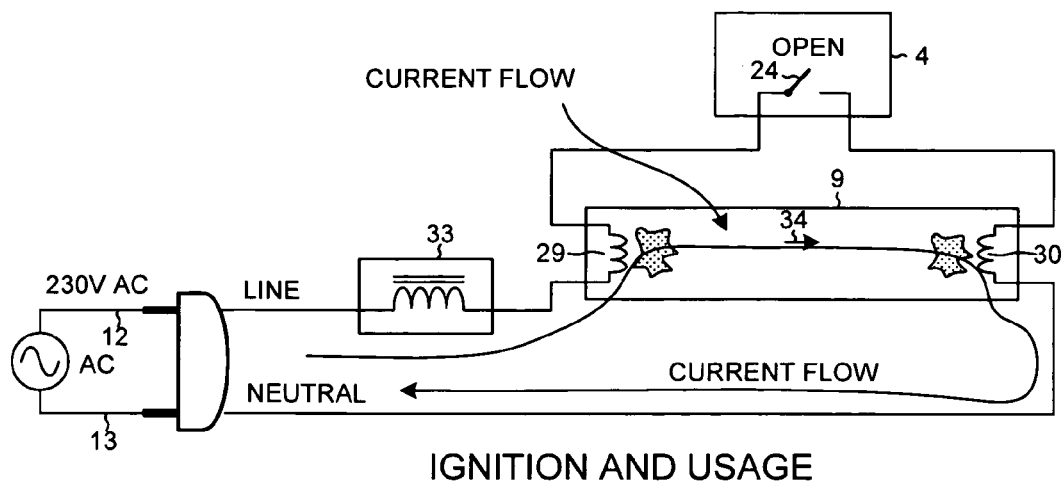

FIGS. 4-7 illustrate how starter unit 4 can turn on fluorescent lamp 9. In an initial condition illustrated in FIG. 4, switch 24 of starter unit 4 is open, and no current is flowing through filaments 29 and 30. The filaments 29 and 30 are relatively cold. Microcontroller 18 then controls switch 24 to close as shown in FIG. 5. An AC current then flows in current path 31 through AC LINE conductor 12, through inductance 33, through filament 29, through closed switch 24, through filament 30, and to AC NEUTRAL conductor 13. This AC current flow 31 causes filaments 29 and 30 to heat, and causes gas in lamp 9 to ionize. This current flow through switch 24 can only be sustained for a relatively short amount of time or switch 24 will overheat and be destroyed. Accordingly, after about one second, switch 24 is opened as illustrated in FIG. 6. The current flow through inductance 33 is interrupted, and this causes a large voltage (for example, one thousand volts or more) to develop across inductance 33. Due to switch 24 being open, a large voltage V+ is present between the two filaments 29 and 30. As illustrated in FIG. 7, large voltage V+ ignites the lamp by causing an arc 34 to form through lamp 9. Due to arc 34, the resistance between the filaments through the lamp decreases. The continued AC current flow continues to keep the filaments hot such that the arc is maintained and current flow continues. The fluorescent lamp is then on and switch 24 remains open.

Figure 8:
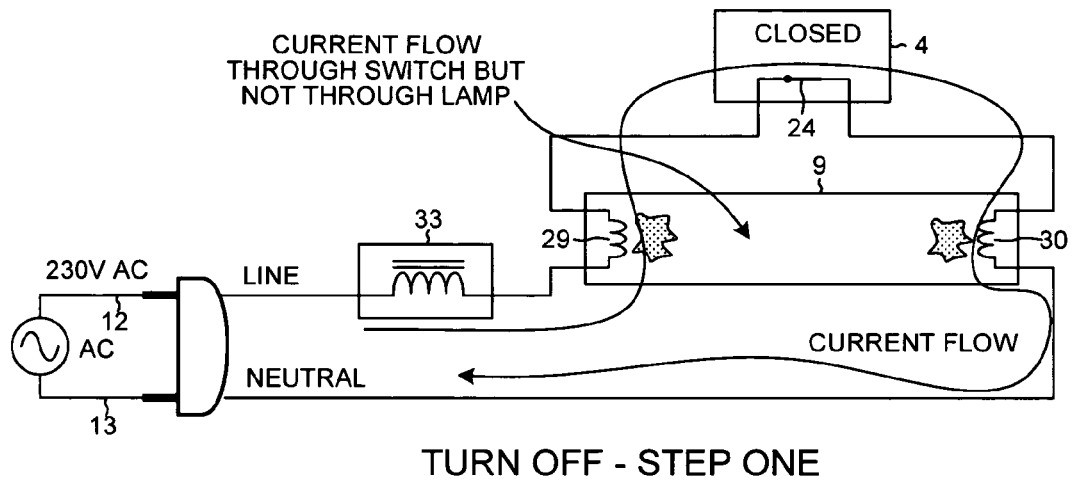
FIGS. 8-11 are circuit diagrams that illustrate how starter unit 4 can turn off fluorescent lamp 9 of the light fixture 3.
Figure 9:
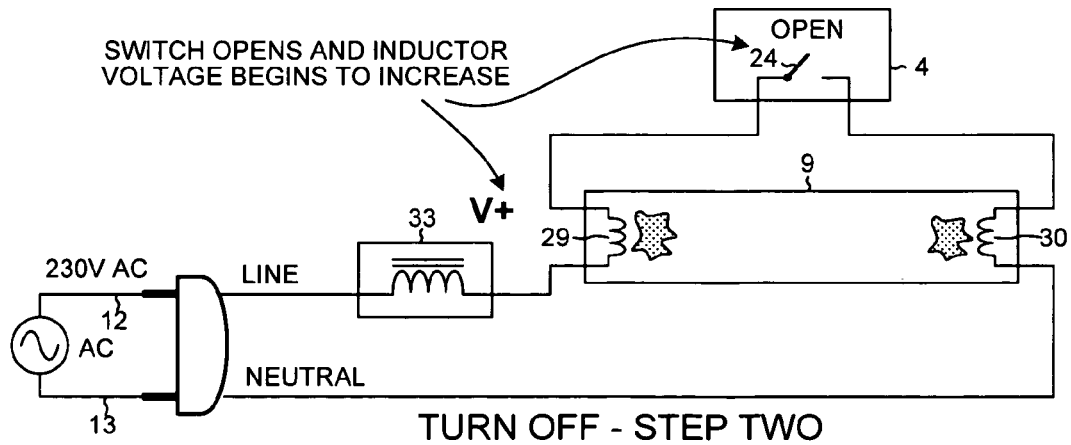
Figure 10:
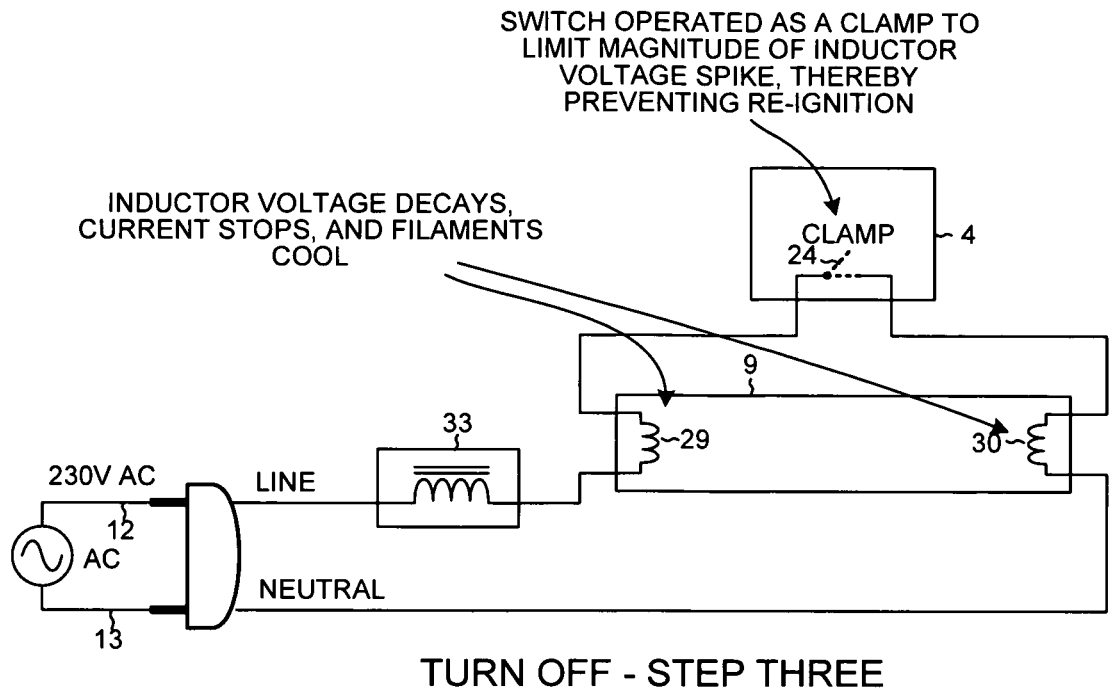
Figure 11:
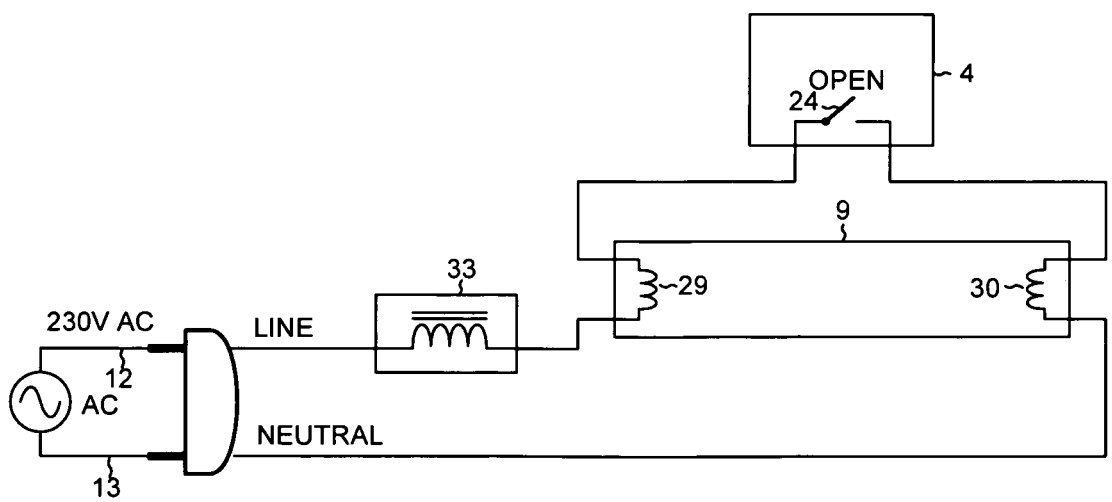

FIGS. 8-11 illustrate how starter unit 4 can turn off fluorescent lamp 9. Initially, fluorescent lamp 9 is on and the circuit is in the state illustrated in FIG. 7. Next, microcontroller 18 controls switch 24 to close as illustrated in FIG. 8. Due to switch 24 being closed, current stops flowing through lamp 9 but rather flows through closed switch 24. Arc 34 is stopped. Current, however, continues to flow through filaments 29 and 30 and the filaments continue to be heated. Switch 24 can only remain closed in this condition for a short amount of time as explained above or the switch will become overheated and will be destroyed. Next, switch 24 is opened as illustrated in FIG. 9. The cutting of current flow through inductance 33 causes a voltage to start to develop across inductance 33, but before the voltage can increase to the point that an arc is ignited through lamp 9, switch 24 is made to operate as a voltage clamp to limit the magnitude of the voltage spike. Clamp operation of switch 24 is represented in FIG. 10 by showing switch 24 in dashed lines. Due to the clamping action of switch 24, the voltage across inductance 33 is not high enough to ignite an arc through lamp 9, and energy stored in a magnetic field in inductance 33 is dissipated. After enough of the energy stored in inductance 33 has been dissipated and after filaments 29 and 30 have stopped ionizing gas to an adequate degree, then switch 24 is opened on a constant basis without igniting an arc. This condition is illustrated in FIG. 11. There is no current flow, and the filaments 29 and 30 begin to cool. The fluorescent lamp is then said to be in the off condition.

Figure 12:
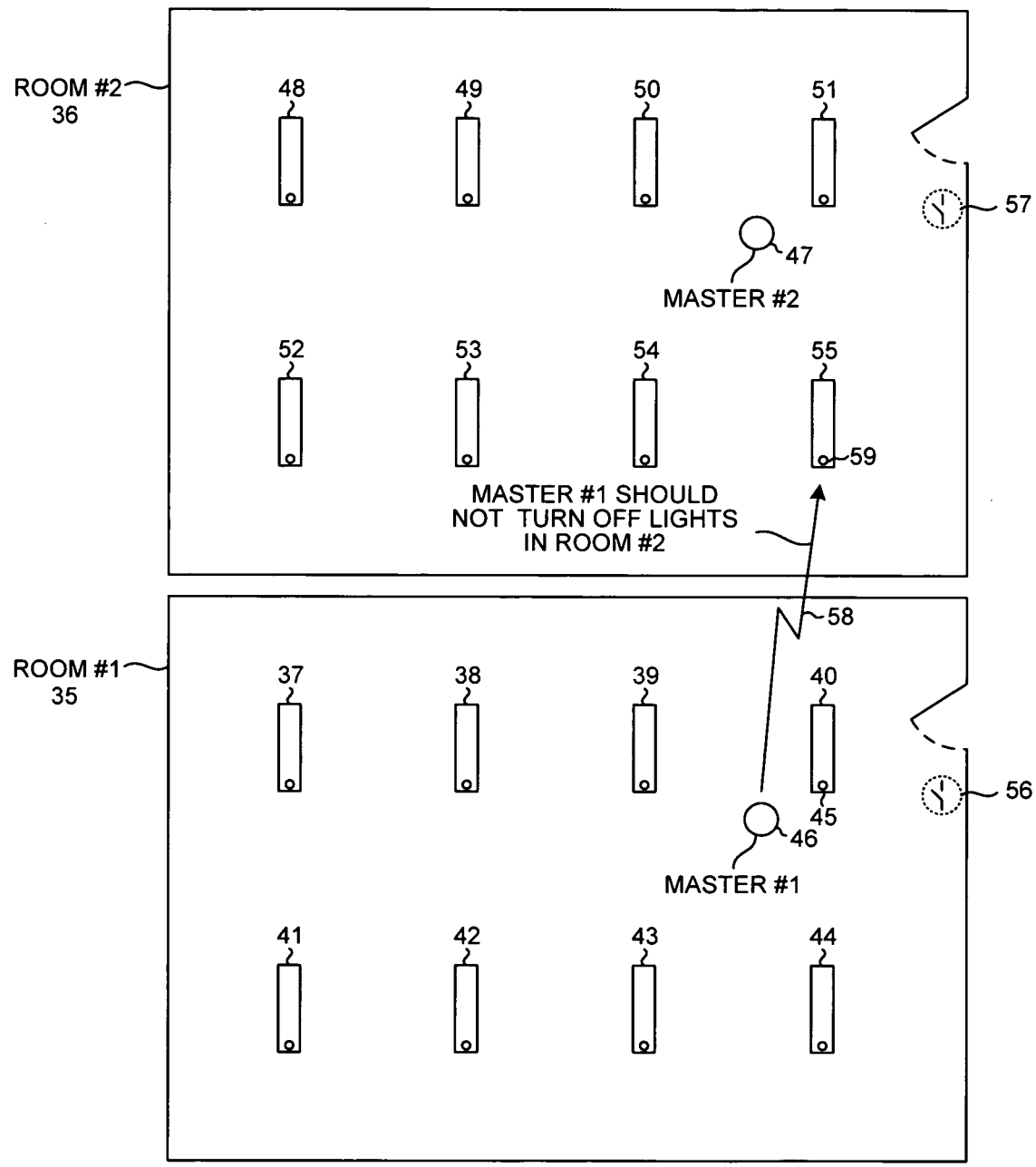
FIG. 12 is a diagram that shows two neighboring systems of RF-enabled starter units and RF-enabled master units. The two systems do not interfere with each other due to the registering of starter units to master units.

FIG. 12 is a diagram that illustrates a situation in which two such systems are in use, one in each of two adjacent rooms 35 and 36. A first system in room 35 involves eight light fixtures 37-44. Each of the light fixtures is a fluorescent light fixture as illustrated in FIG. 1 and includes a replaceable RF-enabled starter unit. Reference numeral 45, for example, is the starter unit for light fixture 40. RF-enabled master unit 46 is to control light fixtures 37-44 of the first system, whereas RF-enabled master unit 47 is to control the light fixtures 48-55. Wall switch 56 is hardwired to switch AC power to the light fixtures of the system in room 35 in customary fashion so that the lights in room 35 can be manually turned on and turned off by manipulating wall switch 56. Similarly, wall switch 57 is hardwired to switch AC power to the light fixtures of the system in room 36 in customary fashion so that the lights in room 36 can be manually turned on and turned off by manipulating wall switch 57.

A problem has been recognized in that in this situation, one of the master units may erroneously communicate with and control a light fixture in the wrong system and in the wrong room. An RF communication 58 transmitted from master unit 46 may, for example, pass through the wall between the two rooms and may be received by starter unit 59. Light fixture 55 may, therefore, be turned off and/or turned on in an undesired way by master unit 46. The light fixtures of the system in room 36 are to be controlled by master unit 47, not master unit 46. In accordance with one novel aspect, each starter unit is registered so that it responds to communications from one of the master units and not to communications from any other master unit. The two systems in the two rooms do not interfere with one another.

Figure 13:
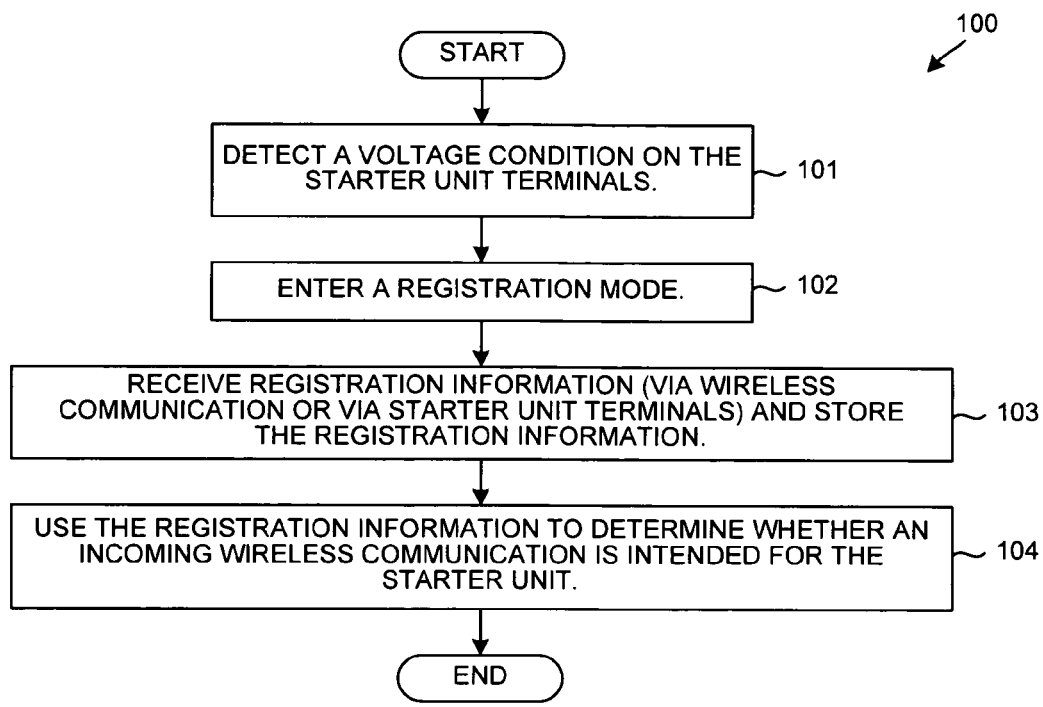
FIG. 13 is a flowchart that illustrates a first method 100 of registering a starter unit. The starter unit receives and stores registration information in response to detecting a voltage condition on its terminals.

FIG. 13 illustrates a first method 100 of registering starter unit 4 to master unit 2 in the field. Starter unit 4, when ordinarily installed in light fixture 3, does not receive a DC voltage across its terminals 14 and 15. The microcontroller 18 in starter unit 4, however, monitors the voltage across terminals 14 and 15. If microcontroller 18 detects the voltage across terminals 14 and 15 to be a DC voltage, then starter unit 4 enters a registration mode. In the registration mode, starter unit 4 receives and stores registration information for later use in confirming that an incoming RF communication is from the correct master unit and is intended for the starter unit.

In one example of the method 100 of FIG. 13, master unit 2 includes a socket 60 into which starter unit 4 can be plugged. Master unit 2 also includes a registration button 61. Prior to installing starter unit 4 into its accommodating socket 62 in light fixture 3, starter unit 4 is first inserted into socket 60 in master unit 2. Socket 60 supplies a DC voltage onto the terminals of the starter unit. In response to receiving DC power onto its terminals 14 and 15, the circuitry of starter unit 4 powers up. Microcontroller 18 uses its ADC to monitor the voltage across terminals 14 and 15 and to determine whether (step 101) the DC voltage across its terminals 14 and 15 is a DC voltage. When microcontroller 18 detects the DC voltage, the microcontroller causes the starter unit to enter (step 102) a registration mode of operation and to monitor incoming communications for a registration communication. The person installing the starter unit then presses registration button 61 on master unit 2. This pressing causes master unit 2 to output a registration communication. Alternatively, the master unit automatically detects that a starter unit has been plugged into socket 60 and in response automatically outputs the registration communication. The registration communication includes registration information that is communicated to, and is received by, starter unit 4.

In one example, the registration communication is an RF communication from master unit 2 that is received by starter unit 4. In another example, the registration communication is received via terminals 14 and 15 in the form of a digital signal. The digital signal may, for example, be superimposed on the DC voltage used to put the starter unit into the registration mode.

Regardless of how starter unit 4 receives the registration communication, the registration information carried in the registration communication is then stored in starter unit 4 for later use in determining (step 104) whether incoming RF communications are output by master unit 2 and are intended for starter unit 4. In the present example, the registration information is stored in non-volatile FLASH memory of the microcontroller.

Once starter unit 4 has been loaded with the registration information, the starter unit 4 is removed from socket 60 and is inserted into socket 62 in light fixture 3. After a predetermined amount of time (after the pressing of the button 61), master unit 2 stops outputting registration communications. In this way, each of the starter units of the system is individually programmed with registration information and is installed into a corresponding light fixture of the system. After registration and installation of the starter units, the system is usable to turn on and to turn off all the light fixtures. If, for example, master unit 4 determines that the room is unoccupied, then the master unit 4 may transmit RF communications to all the starter units of its system. Each RF communication includes a command that includes both a source registration identifier code identifying master unit 4 as well as a destination registration identifier code identifying the starter unit or a group of starter units. The starter units are individually and group controllable. When a starter unit receives an RF communication, and before carrying out the command of the received RF communication, the starter unit uses the registration information stored in its FLASH memory to confirm that the RF communication received is intended for that starter unit. If the starter unit determines that the RF communication is not intended for the starter unit, then the starter unit ignores the RF communication or takes another predetermined action. The starter unit may retransmit the communication to relay the communication to starter units that are more remotely located from the master unit.

In the example of FIG. 12, RF communication 58 does not cause starter units in room #2 to be turned on and/or turned off because the starter units in room #2 are programmed to have registration information associating them with master unit 47 as opposed to master unit 46. Similarly, starter units in room #1 will not be turned on and/or turned off by RF communications received from master unit 47 because the starter units of the system in room #1 are programmed to have registration information associating them with master unit 46 as opposed to master unit 47.

Figure 14:
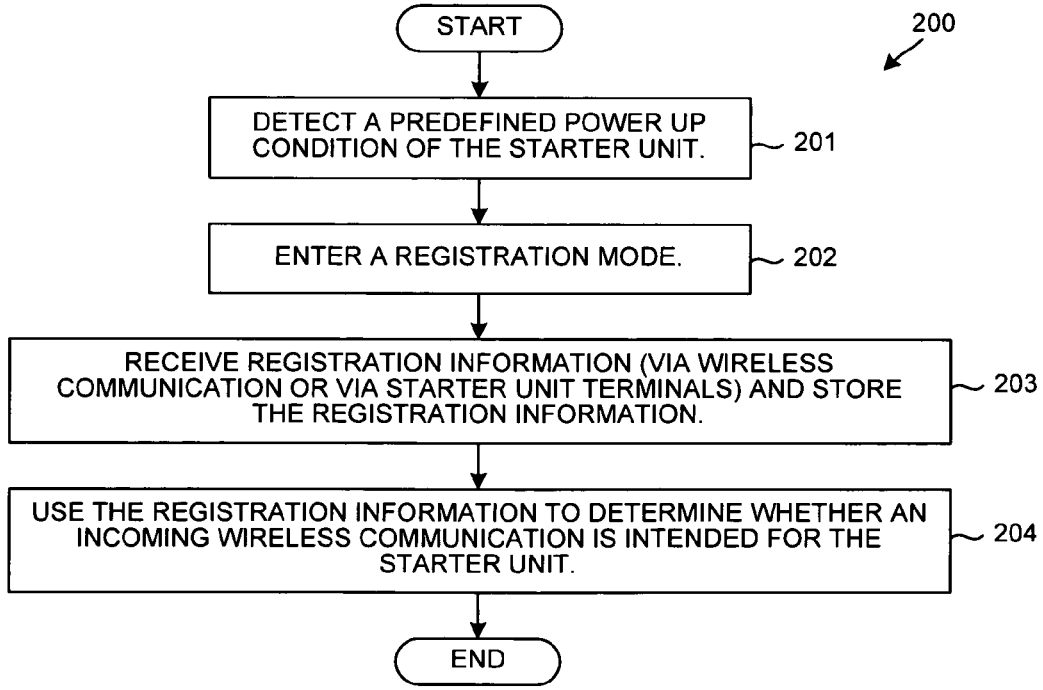
FIG. 14 is a flowchart that illustrates a second method 200 of registering a starter unit. The starter unit receives and stores registration information in response to detecting a predefined power up condition.

FIG. 14 illustrates a second method 200 of registering starter unit 4 to master unit 2 in the field. Rather than entering the registration mode in response to detecting a DC voltage as in method 100 of FIG. 13, the starter unit detects a predefined power up condition (step 201) of the starter unit. In one example, the power up condition is a repeated powering up of the starter unit an approximate number of times at an approximate repetition rate. After a certain number of power up events occur that meet the timing criteria, the starter unit determines that the predefined power up condition has occurred. In one example, in order for the starter unit to determine that the predefined power up condition has occurred, AC power to the starter unit must be toggled on and off three times or more in a thirty second period, where each toggle, to be reliably counted as a legitimate toggle, must occur no faster than once in a five second period. The microcontroller in the starter unit remains in a low-power mode of operation throughout this thirty second period, and uses its on-board timer functionality to time the occurrences of the detected AC toggles. In response to the starter unit determining that the predefined power up condition has occurred, the starter unit enters the registration mode.

In one operational example, a person installs unregistered RF-enabled starter units in all the light fixtures of a system. An unregistered starter unit functions to turn on its associated fluorescent lamp when AC power is applied to the light fixture and to leave the fluorescent lamp on as long as AC power continues to be supplied. After the unregistered starter units are installed in the light fixtures of the system, the person presses button 61 (see FIG. 1) on master unit 2. Pressing button 61 causes master unit 2 to transmit registration commands for a certain period of time. Before this time expires, the person repeatedly turns on and turns off the lights using wall switch 11 and at the end of this repeated turn on/off process leaves wall switch 11 in the position that the lights are on. The lights in the other room are presumably not turned on and turned off in this unusual fashion. The starter units of the system being configured detect and count and time each of the predefined power up events. After a predetermined number of predefined power up events have occurred within a predetermined amount of time (for example, three power up events within one thirty second period as timed by each starter unit), the starter units determine that the defined power up condition (step 201) has occurred. In response, the starter units enter (step 202) the registration mode. Once in the registration mode, the starter units request registration and receive the RF registration information from the master unit. The starter units store (step 203) the registration information in non-volatile memory for later use. The registration information includes a source identifier that identifies the master unit. Each starter unit of the system being configured thereafter uses (step 204) the stored registration information to determine whether subsequently receiving incoming RF communications are intended for the starter unit.

In addition to the ways described above of registering a starter unit, the starter units of a system may be registered as follows. During power up, the starter unit reads a known location in FLASH memory for registration information. If the registration information is invalid (the default condition of an unregistered starter unit), then the starter unit enters a wireless registration mode. This can be done in addition to method 200 of FIG. 14 that forces the starter unit to enter registration mode after detecting a predefined power up condition (step 201), regardless of whether the starter unit has valid or invalid registration information. In some examples, the starter unit enters wireless registration mode after step 101 of FIG. 13 in which the starter unit is forced into wireless registration mode after detecting a DC voltage on the starter unit terminals. Once in the wireless registration mode, the starter unit periodically broadcasts a registration request to a master unit also in wireless registration mode. The period is chosen at random within a suitable interval, for example between 1 and 2 seconds. This reduces the likelihood of multiple starter units attempting to send registration requests at the same time when multiple unregistered starter units are simultaneously activated. The registration request also includes an identifier generated by the starter unit of sufficient size to distinguish it from other unregistered starter units attempting to send a registration request at the same time. The starter-generated identifier may, for example, be a serial number or a pseudo-random number of sufficient length to reduce the likelihood of multiple starter units generating the same pseudo-random value as other un-registered starter units. A master unit is placed into registration mode, for example, by pressing button 61. Once in the wireless registration mode, the master unit listens for registration requests from starter units for a predetermined amount of time before returning to normal operating mode. If a registration request is received, then the master validates the request and sends a registration response message that includes the starter unit's registration information. The registration information includes the master's unique identifier and assigns the unregistered starter unit a unique identifier that is only valid within the domain of the master unit that generated the registration response. The registration response also includes the unique starter-generated value that the requesting starter unit had sent to the master unit. This unique starter-generated value is sent back to the starter unit so that multiple starter units listening for registration responses are able to distinguish their responses from registration responses intended for other starter units. Once the starter unit receives a registration response with the same starter-generated value it had previously transmitted in its registration request, then the starter unit stores the received registration information into a known location in its FLASH memory.

Upon subsequent power up events the starter unit will use this information stored in its FLASH memory to determine that it already has valid registration information. It will not therefore return to the wireless registration mode unless the methods of FIG. 13 (step 101) or FIG. 14 step (201) are detected or the registration information stored in the known location in FLASH memory is otherwise made invalid (possibly in response to a command received from the starter unit's master during normal operations).

Each starter unit maintains status information in FLASH that indicates whether the starter unit is properly registered. When unregistered starter unit 4 powers up (for example, due to being plugged into socket 60 after button 61 has been pressed), and if starter unit 4 determines that it is being powered from a DC voltage source, then the starter unit enters the registration mode and transmits a request-to-register RF communication. This RF request-to-register communication includes an identifier that is unique to the particular starter unit. In one example, the starter unit at this time is plugged into socket 60 and is being powered by the relatively high DC voltage supplied by master unit 2 as a consequence of button 61 being pressed. Master unit 2 receives the RF request-to-register communication, and responds by transmitting an RF registration communication back to starter unit 4. The RF registration communication includes both an identifier that identifies the master unit as well as the identifier that identifies the particular requesting starter unit. The starter unit receives the RF registration communication and determines from the identifier of the starter unit portion of the registration communication that the registration communication is intended for it (for starter unit 4 as opposed to being intended for another starter unit). If starter unit 4 makes this determination, then starter unit 4 stores the identifier of master unit 2 in its FLASH along with status information that indicates that the starter unit is now registered. The registered starter unit 4 is then removed from socket 60 of master unit 2, and is installed in socket 62 in light fixture 3. The next time starter unit 4 is powered up, starter unit 4 checks the status information indicative of whether the starter unit is properly registered. Because the status information now indicates that the starter unit is properly registered, starter unit 4 does not enter the registration mode and does not transmit an RF request-to-register communication. Starter unit 4, however, operates normally in system 1 and uses the stored master identification information to identify RF communications intended for it as opposed to communications intended for other starter units. In this way, individual starter units are registered one at a time (for example, by plugging them one by one into socket 60 of master unit 2). The individual registration allows the master unit to control starter units on an individual basis due to both the master unit and the starter unit being aware of the identifier of the starter unit and the identifier of the master unit. The starter unit identifier need not be communicated from starter unit to master unit in a request-to-register communication, but rather the starter unit identifier can be issued by the master unit and communicated to the starter unit in the registration communication in examples in which only one starter unit is in the registration mode at a given time. Use of socket 60 and the detection by a starter unit of its being powered by a DC voltage source allows ensures that only one starter unit is in the registration mode at a given time.

Although certain specific embodiments are described above for instructional purposes, the teachings of this patent document have general applicability and are not limited to the specific embodiments described above. The particular ways of registering a starter unit to a master unit in the field by causing the starter unit to receive and to store registration information set forth in the description above are just illustrative examples. Other ways of registering a starter unit in the field are possible. For example, the master unit may generate and issue starter unit identifiers to starter units on a rolling basis, with the starter units and the master unit communicating on an ad hoc basis to associate individual starter units with individual starter unit identifiers. In some embodiments, the master unit may not include socket 60 but rather a separate handheld unit may be provided that includes a socket that supplies the DC voltage to put the starter unit into the registration mode. Where there are many master units in use, manufacturing costs may be reduced by providing one handheld unit for registering starter units to multiple master units as opposed to providing a socket 60 on each of the many master units. In systems in which individual starter units are individually controllable, a master unit may turn on and/or turn off some fluorescent lamps of the system separately from other fluorescent lamps of the system. The RF transceivers of the starter units may form a wireless network usable to communicate other types of information. Master units need not be installed on ceilings and need not take the form illustrated in FIG. 1, but rather may take other forms and may be incorporated into other objects and devices such as wall switches. The registering of a circuit in a wirelessly-controllable fluorescent light fixture to a wireless central master unit is not limited to any particular type of fluorescent lamp technology and is not limited to preheat lamps having thermionic filaments and inductive ballasts. Although an example of the master/starter unit system is described above involving a 230 volts AC power system, the master/starter unit system can work with other AC power sources such as 120 volts as well as with DC power sources. Accordingly, various modifications, adaptations, and combinations of various features of the described embodiments can be practiced without departing from the scope of the invention as set forth in the claims.

What is claimed is:

1. A method comprising: (a) registering a wireless fluorescent lamp starter unit to a master unit, wherein the registering involves storing registration information in the starter unit so that the registration information is then usable to distinguish wireless communications received from the master unit from other wireless communications received onto the master unit.

2. The method of claim 1, wherein the wireless fluorescent lamp starter unit includes a Radio-Frequency (RF) receiver and does not include a glass tube, the wireless fluorescent lamp starter unit having a substantially cylindrical outer surface and a circular bottom surface, and wherein two terminals extend from the circular bottom surface.

3. The method of claim 1, further comprising:
 (b) using the wireless fluorescent lamp starter unit to turn off a fluorescent lamp in response to receiving a wireless communication from the master unit.

4. The method of claim 1, wherein said registering of (a) involves:
 (a1) detecting a repeated applying of an alternating current (AC) voltage to the starter unit;
 (a2) in response to the detecting of (a1) entering a registration mode; and
 (a3) in the registration mode receiving registration information from the master unit and storing the registration information in non-volatile storage in the starter unit, wherein the registration information is usable to associate the starter unit and the master unit, and wherein the detecting of (a1), the entering of (a2) and the receiving and storing of (a3) are performed by the starter unit.

5. The method of claim 1, wherein the wireless fluorescent lamp starter unit is replaceable with a second wireless fluorescent lamp starter unit such that the second starter unit is registerable to the master unit.

6. The method of claim 1, further comprising:
 (b) using the wireless fluorescent lamp starter unit to turn on a fluorescent lamp by cutting a current flow through an inductance.

7. A method comprising:
 (a) registering a wireless fluorescent lamp starter unit to a master unit, wherein said registering of (a) involves:
  (a1) detecting a direct current (DC) voltage present between two terminals of the starter unit;
  (a2) in response to the detecting of (a1) entering a registration mode; and
  (a3) in the registration mode receiving registration information from the master unit and storing the registration information in non-volatile storage in the starter unit, wherein the registration information is usable by the starter unit to associate the starter unit and the master unit, and wherein the detecting of (a1), the entering of (a2) and the receiving and storing of (a3) are performed by the starter unit.

8. The method of claim 7, wherein the registration information received in (a3) is received via a wireless communication from the master unit to the starter unit.

9. The method of claim 7, wherein the registration information received in (a3) is received via a wired connection between the master unit and the starter unit.

10. A method comprising: (a) registering a wireless fluorescent lamp starter unit to a master unit, wherein the registering of (a) involves: (a1) entering a registration mode in response to an exiting of a power up condition of the starter unit; and (a2) in the registration mode receiving registration information from the master unit and storing the registration information in non-volatile storage in the starter unit, wherein the registration information is usable by the starter unit to identify wireless communications from the master unit, and wherein the entering of (a1) and the receiving and storing of (a2) are performed by the starter unit.

11. The method of claim 10, wherein the starter unit maintains status information indicative of whether or not the starter unit is registered, and wherein the registration information received and stored in (a2) is used to register the starter unit if the status information indicates that the starter unit is not registered at the time of the receiving of (a2).

12. A method comprising: (a) registering a wireless fluorescent lamp starter unit to a master unit, wherein the registering of (a) involves: (a1) entering a registration mode by detecting a power up condition; and (a2) in the registration mode receiving registration information from the master unit via a wireless communication and storing the registration information in non-volatile storage in the starter unit, wherein the registration information is usable to associate the starter unit and the master unit, and wherein the entering of (a1) and the receiving and storing of (a2) are performed by the starter unit.

13. The method of claim 12, wherein the power up condition detected in (a1) is a condition of repeatedly experiencing application of an alternating current (AC) voltage to the starter unit.

14. A method comprising: providing a wireless fluorescent lamp starter unit adapted to be registered with a master unit, whereupon after registration of the starter unit with the master unit the starter unit is usable to turn off a fluorescent lamp; wherein the starter unit is adapted to be registered with the master unit by detecting a condition on two terminals of the starter unit and in response to the detecting of the condition receiving registration information from the master and storing the registration information into the starter unit.

15. The method of claim 14, wherein the starter unit is adapted to receive a wireless communication and in response to turn off the fluorescent lamp, and wherein the starter unit is adapted to be plugged into a receiving socket of a light fixture of which the fluorescent lamp is a part.

16. A wireless fluorescent lamp starter unit, comprising:
 a first terminal;
 a second terminal;
 a receiver that receives a wireless communication onto the wireless fluorescent lamp starter unit;
 fluorescent lamp interface circuitry coupled to the first terminal and to the second terminal; and
 a microcontroller that executes an amount of firmware, wherein the microcontroller stores registration information and causes the starter unit to use the registration information to determine whether the wireless communication is intended for the wireless fluorescent lamp starter unit, wherein the microcontroller is adapted to control the fluorescent lamp interface circuitry such that a fluorescent lamp coupled to the first and second terminals can be selectively turned on under firmware control and turned off under firmware control, and wherein execution of the amount of firmware by the microcontroller causes:
  the microcontroller and the fluorescent lamp interface circuitry to operate together to determine whether a direct current (DC) voltage is present between the first and second terminals;
  the microcontroller to enter a registration mode if it is determined by the microcontroller that the DC voltage is present between the first and second terminals;
  in the registration mode, the wireless fluorescent lamp starter unit to store the registration information; and
  the registration information to be used by the wireless fluorescent starter unit to determine whether a wireless communication is intended for the wireless fluorescent starter unit.

* * * * *